United States Patent
Kondo

[11] Patent Number: 5,991,489
[45] Date of Patent: Nov. 23, 1999

[54] OPTICAL TI-DIFFUSED LINBO₃ WAVEGUIDE DEVICE AND METHOD OF MANUFACTURING SAME

[75] Inventor: Atsuo Kondo, Okazaki, Japan

[73] Assignee: NGK Insulators, Ltd., Japan

[21] Appl. No.: 08/994,544

[22] Filed: Dec. 19, 1997

[30] Foreign Application Priority Data

Dec. 27, 1996 [JP] Japan .................................. 8-351274

[51] Int. Cl.⁶ .................................................. G02B 6/10
[52] U.S. Cl. ......................................... 385/129; 385/130
[58] Field of Search ..................................... 385/129–132

[56] References Cited

U.S. PATENT DOCUMENTS

| | | | |
|---|---|---|---|
| 4,196,963 | 4/1980 | Chen et al. | 350/96.12 |
| 4,343,890 | 8/1982 | Phillips et al. | 430/321 |
| 5,365,338 | 11/1994 | Bramson | 356/350 |
| 5,680,497 | 10/1997 | Seino et al. | 385/129 |

OTHER PUBLICATIONS

"MgO/Ti Bilaterally Diffused LiNbO₃ Optical Switch "; Nobuyuki Tanaka et al.: Applied Optics, vol. 29, No. 34, Dec. 1, 1990, pp. 5090–5095, XP000165711 *chapter IIA 'Ti Diffused Waveguide '*.

"Simple Control of Ti–Diffused LiNbo₃ WaveGuide Profile and Propogation Characteristics"; A. Nutt and E. Sudo: Electronics Letters, vol. 24, No. 1, Jan. 7, 1988, Stevenage, pp. 56–58, XP002059865 *the whole document*.

Patent Abstracts of Japan; vol. 017, No. 024 (P–1471), Jan. 18, 1993 & JP 04 249215 A (Pioneer Electron Corp), Sep. 4, 1992, *abstract*.

Patent Abstracts of Japan; vol. 095, No. 009, Oct. 31, 1995 & JP 07 159637 A (Nikon Corp), Jun. 23, 1995, *abstract*.

"Use of a Rapid Thermal Annealing System to Initiate Indiffusion for Fabrication of Ti:LiNbO₃ Optical Channel WaveGuides"; D.C. Cromer et al.: Applied Optics, vol. 28, No. 1, Jan. 1, 1989, pp. 33–36, XP000037671 *the whole document*.

Experimental Measurements and Theoretical Comparisons on the Mode size of Single–Mode Ti:LiNbO₃ Optical Channel WaveGuides; YM Choi et al.: International Journal of Infrared and Millimeter Waves, vol. 16, No. 9, Sep. 1, 1995, pp. 1561–1571, XP000534667 *the whole document*.

"Integrated–Optic Devices in Lithium Niobate: Technology and Applications"; A. Neyer: Electro Optic and Magneto Optic Materials 2, The Hague, Mar. 12–13, 1990, No. vol. 1274, Mar. 12, 1990, H. Dammann, pp. 2–17, XP000218564 *chapter IIIA 'fiber–waveguide coupling '*.

*Primary Examiner*—John D. Lee
*Assistant Examiner*—Victoria D. Hao
*Attorney, Agent, or Firm*—Parkhurst & Wendell, L.L.P.

[57] ABSTRACT

An optical waveguide device includes an LiNbO₃ substrate and an optical waveguide disposed on the LiNbO₃ substrate by diffusing Ti therein. The LiNbO₃ substrate has a step on a surface thereof which corresponds to the area in which Ti is diffused. The step has opposite side edges and a central area therebetween, the side edges having a height greater than a height of the central area, whereby the side edges are raised higher than the central area. The optical waveguide device has a relatively small coupling loss with respect to an optical fiber having a small light beam mode shape, thus eliminating optical device loss faults.

8 Claims, 13 Drawing Sheets

OPTICAL TI-DIFFUSED LINBO₃ WAVEGUIDE DEVICE AND METHOD OF MANUFACTURING SAME

BACKGROUND OF THE INVENTION

1. Field of the Invention

The present invention relates to an optical waveguide device and a method of manufacturing such an optical waveguide device, and more particularly to an optical waveguide device comprising an optical waveguide mounted on an $LiNbO_3$ substrate by diffusing Ti therein, i.e., a Ti-diffused $LiNbO_3$ waveguide, and a method of manufacturing such an optical waveguide device.

2. Description of the Related Art

Optical waveguides are generally capable of confining a radiation within a certain region and guiding and propagating the confined energy of the radiation parallel to the axis of the waveguide passage. At present, efforts are being made to replace optical light guides, typically, optical fibers, with optical waveguides for thereby reducing the size of optical components.

The optical waveguides include semiconductor waveguides of GaAs and InP, dielectric (glass) waveguides using glass substrates, and ferroelectric crystal waveguides of $LiNbO_3$ and $LiTaO_3$ crystals.

In particular, optical devices such as optical-waveguide modulators for imparting information through electrodes to a light beam that is transmitted through optical waveguides comprise Ti-diffused $LiNbO_3$ waveguides in which Ti is diffused in an $LiNbO_3$ crystal that has excellent electrooptical properties.

Figure 13:
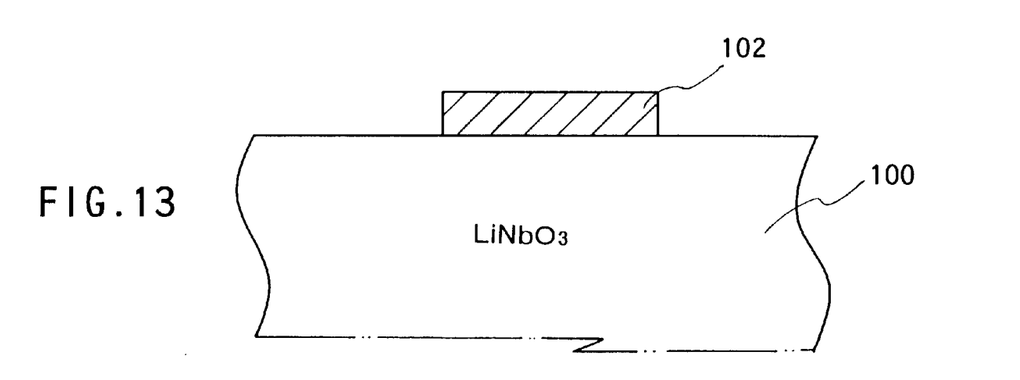
FIG. 13 is a cross-sectional view illustrative of a process of fabricating a Ti-diffused $LiNbO_3$ waveguide, showing a stage in which a Ti film is formed on an $LiNbO_3$ substrate.

As shown in FIG. 13 of the accompanying drawings, a Ti-diffused $LiNbO_3$ waveguide comprises an $LiNbO_3$ substrate 100 and a metal film 102 of Ti deposited to a thickness of several hundreds Å on the $LiNbO_3$ substrate 100 and thermally diffused at a temperature of about 1000° C. for 4–10 hours.

Figure 14:
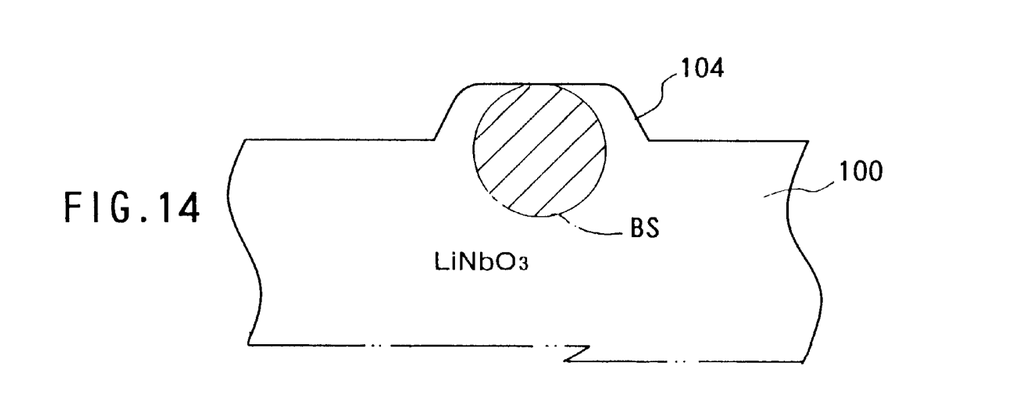
FIG. 14 is a cross-sectional view illustrative of the mode shape of a light beam in a conventional optical waveguide.

As shown in FIG. 14 of the accompanying drawings, the Ti-diffused $LiNbO_3$ waveguide which has a small smooth step 104 on the Ti-diffused region of the $LiNbO_3$ substrate 100 has been considered as being characteristically good. Those Ti-diffused $LiNbO_3$ waveguides which have surface irregularities (surface roughness) on the step 104 have been considered as being not preferable because those surface irregularities tend to increase a light beam propagation loss.

In order to prevent the surface roughness, it has heretofore been customary to introduce water vapor while Ti is being diffused or place a powder containing Li, such as a powder of $LiNbo_3$ in the diffusion chamber.

The loss of an optical waveguide is determined by a combination of the propagation loss and a coupling loss with respect to the optical mode of an optical fiber. The coupling loss is represented by the ratio of the mode shape of a light beam propagated through the optical waveguide, i.e., the shape of a light beam with respect to a plane perpendicular to the optical axis of the optical waveguide, to the mode shape of a light beam propagated through the optical fiber, i.e., the shape of a light beam with respect to a plane perpendicular to the optical axis of the optical fiber. The coupling loss is larger as the ratio is larger or smaller than 1.

As shown in FIG. 14, on the optical waveguide having a smooth surface configuration for the $LiNbO_3$ substrate 100, the step 104 of the Ti-diffused region has a uniform height distribution, and the shape of the plane perpendicular to the optical axis with respect to the diffused distribution of Ti, i.e., the mode shape BS of the light beam propagated through the optical waveguide, is substantially circular. This is considered to result from substantially isotropic diffusion of Ti due to the smooth surface of the step 104.

The coupling loss of the optical fiber with respect to a general optical fiber which propagates light with a randomly varying plane of vibration (plane of polarization) is small. However, the coupling loss of the optical fiber with respect to an optical fiber in which the mode shape of a light beam is not circular, among polarization-maintaining fibers which propagate light with a plane of polarization being kept in a certain direction, is large. Particularly, the coupling loss of the optical fiber with respect to an optical fiber in which the aspect ratio of the mode shape of a light beam is not 1, e.g., an optical fiber in which the core is of an elliptical cross-sectional shape, is very large.

If an optical component is to be fabricated using a polarization-maintaining fiber, then since the coupling loss described above greatly affects the optical characteristics (device characteristics) of the optical component, it is necessary to reduce the coupling loss of an optical waveguide even in the sacrifice of a certain propagation loss.

SUMMARY OF THE INVENTION

It is therefore an object of the present invention to provide an optical waveguide device whose coupling loss with respect to an optical fiber in which the mode shape of a light beam is elliptical is relatively small for thereby eliminating optical device loss faults, and a method of manufacturing such an optical waveguide device.

Another object of the present invention is to provide an optical waveguide device whose coupling loss with respect to a polarization-maintaining fiber that will be used in optical components such as optical-waveguide modulators or the like is relatively small for thereby increasing the performance of optoelectronic devices which incorporate optical-waveguide modulators or the like, and a method of manufacturing such an optical waveguide device.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENTS

An optical waveguide device and a method of manufacturing such an optical waveguide device according to the present invention will be described below as being applied to an optical IC chip included in a closed-loop phase-modulation optical fiber gyro, for example, with reference to FIGS. 1 through 12.

Figure 1:
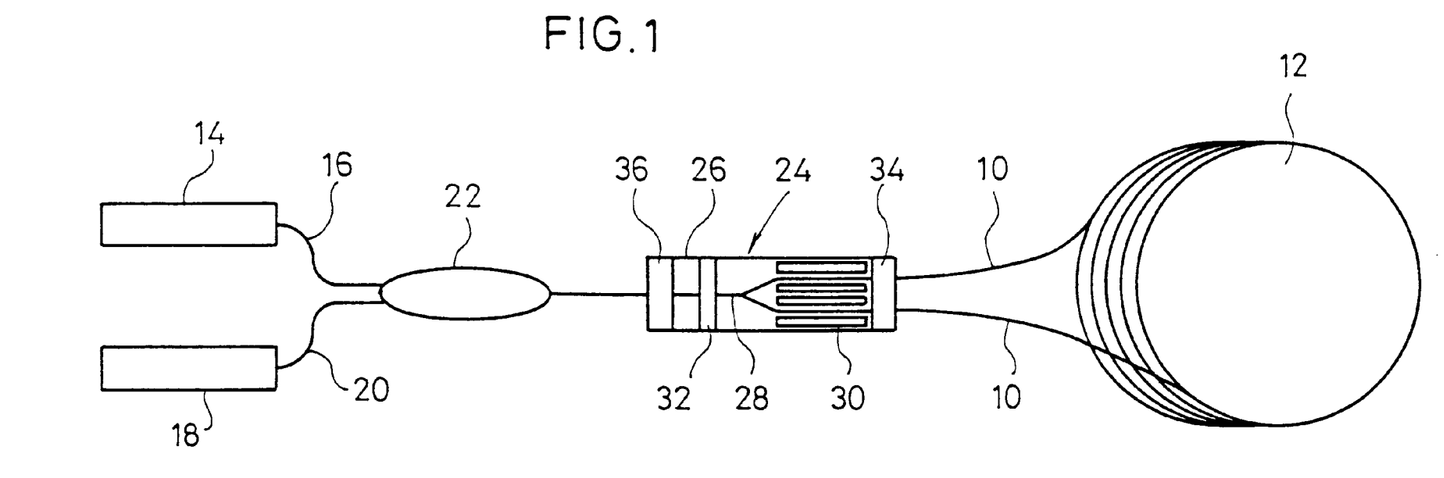
FIG. 1 is a plan view of a closed-loop phase-modulation optical fiber gyro including an optical IC chip which incorporates an optical waveguide device according to the present invention.

As shown in FIG. 1, a closed-loop phase-modulation optical fiber gyro has a fiber coil 12 which comprises a number of turns of an elongate optical fiber 10 which is a polarization-maintaining fiber whose core has an elliptical cross-sectional shape, a coupler 22 optically connecting an optical fiber 16 extending from a light source 14 to an optical fiber 20 leading to a photodetector 18, and an optical IC chip 24 connected between the fiber coil 12 and the coupler 22. The optical IC chip 24 comprises an optical waveguide 28 of a predetermined shape, such as an Y-shaped optical waveguide, for example, mounted on an $LiNbo_3$ substrate 26, and a phase modulator 30 and a polarizer 32 that are mounted on the optical waveguide 28. The light source 14 may comprise a superluminescent diode (SLD).

Two ends of the optical fiber 10 extending from the fiber coil 12 are fixed to a first array 34 which serves to restrict the direction in which the optical fiber 10 is connected to the optical IC chip 24. An end of the optical fiber 16 extending from the coupler 22, i.e., an end of the optical fiber 16 led from the light source 14, is fixed to a second array 36 which serves to restrict the direction in which the optical fiber 16 is connected to the optical IC chip 24. In this manner, the ends of the optical fibers 10, 16 are optically connected to the optical IC chip 24 through the first and second arrays 34, 36.

Figure 2A:
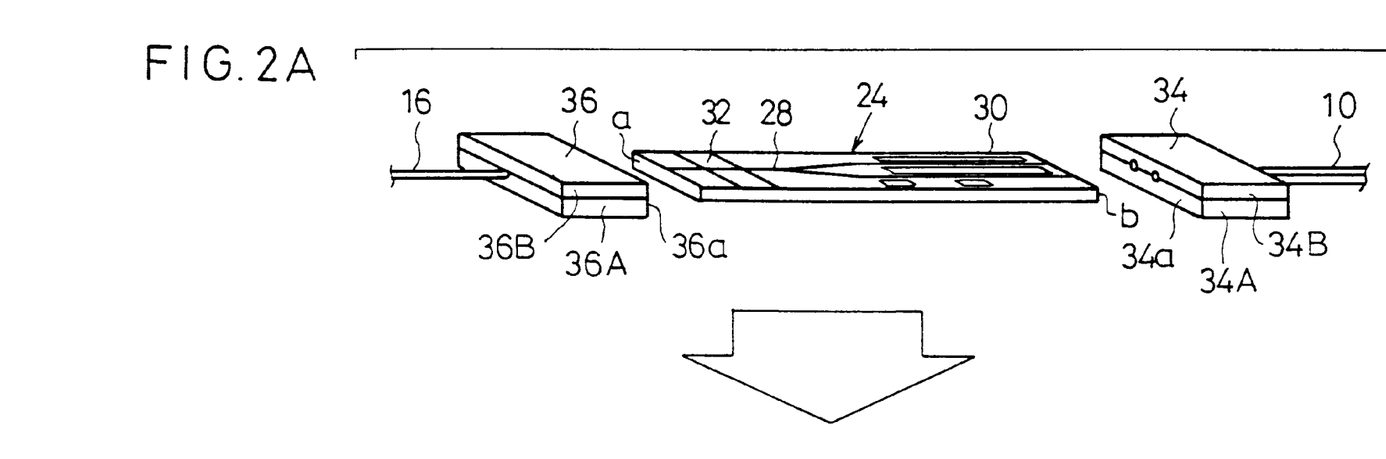
FIG. 2A is a perspective view of a step of positioning the IC chip with respect to first and second arrays.
Figure 2B:
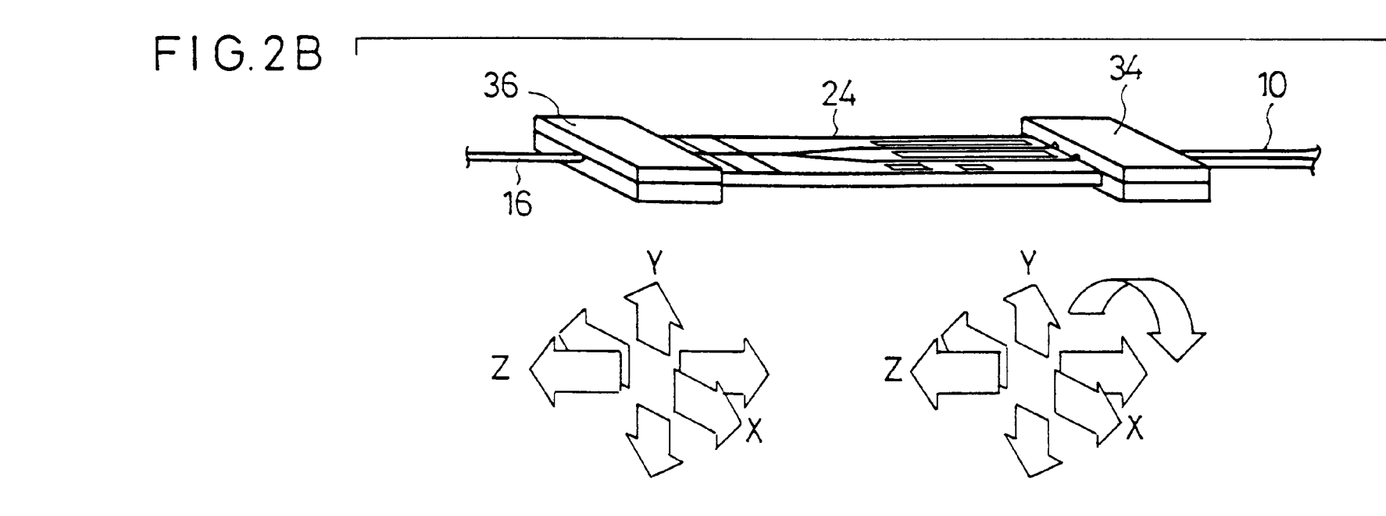
FIG. 2B is a perspective view of a step of axially adjusting and bonding the IC chip and the first and second arrays.

Specifically, as shown in FIG. 2A, the first array 34 comprises a base substrate 34A having two V-shaped grooves (not shown) defined in a principal surface thereof and extending toward an end thereof, and a lid substrate 34B placed on the base substrate 34A in covering relation to the V-shaped grooves. The two V-shaped grooves are spaced from each other by such a distance that their axes are aligned with respective optical axes of two branch paths in the optical waveguide 28.

The first array 34 is assembled as follows: As shown in FIG. 2A, the ends of the optical fiber 10 are placed in the respective V-shaped grooves of the base substrate 34A, and thereafter a polarization-maintaining plane of the optical fiber 10 is aligned with a plane of polarization of light propagated through the optical waveguide 28, e.g., the direction of the major axis of the cross-sectional shape of the core of the optical fiber 10 is aligned with the horizontal direction. Subsequently, the lid substrate 34B is placed over the base substrate 34A and bonded thereto by an adhesive. Then, an end 34a of the first array 34 where free ends of the optical fiber 10 are exposed is ground. The process of fixing the optical fiber 10 to the first array 34 is now completed.

As shown in FIG. 2A, the second array 36 comprises a base substrate 36A having a V-shaped groove (not shown) defined in a principal surface thereof and extending toward an end thereof, and a lid substrate 36B placed on the base substrate 36A in covering relation to the V-shaped groove. The second array 34 is assembled as follows: The end of the optical fiber 16 is placed in the V-shaped groove of the base substrate 36A, and thereafter a polarization-maintaining plane of the optical fiber 16 is aligned with a plane of polarization of light propagated through the optical waveguide 28, e.g., the direction of the major axis of the cross-sectional shape of the core of the optical fiber 16 is aligned with the horizontal direction. Subsequently, the lid substrate 36B is placed over the base substrate 36A and bonded thereto by an adhesive. Then, an end 36a of the second array 36 where a free end of the optical fiber 16 is exposed is ground. The process of fixing the optical fiber 16 to the second array 36 is now completed.

The optical IC chip 24 is fabricated as follows: First, optical waveguides 28 (see FIG. 1) of certain shape is formed on a principal surface (functional surface) of a wafer, e.g., an LiNbO$_3$ substrate 26, and then polarizers 32 and phase modulators 30 (see FIG. 1) are formed on the optical waveguide 28, producing a number of optical IC patterns on the wafer.

Thereafter, groups of optical IC patterns are severed from the wafer (cutting step), and then ends a, b of the groups, to which the first and second arrays 34, 36 will be joined, are ground (grinding step). Subsequently, the optical IC patterns are severed from each of the groups into a number of optical IC chips 24 (chip cutting step). Each of the severed optical IC chips 24 is used as an optical integrated circuit for an optical fiber gyro.

Then, as shown in FIG. 2A, the first and second arrays 34, 36 to which the optical fibers 10, 16 have been connected are joined to the optical IC chip 24. Specifically, the second array 36 is joined to the end a of the optical IC chip 24 near the polarizer 32 in optically coaxial alignment, and the first array 34 is joined to the end b of the optical IC chip 24 near the phase modulator 30 in optically coaxial alignment.

The first and second arrays 34, 36 joined, i.e., bonded by an adhesive, to the optical IC chip 24 in optically coaxial alignment with respect to three orthogonal X, Y, Z axes and a rotational axis of the optical fiber 10 (see FIG. 2B) for maximum optical output power.

In this manner, the optical fiber gyro which incorporates the optical IC chip 24 is fabricated.

A process of manufacturing the optical IC chip 24, particularly the optical IC pattern, will be described below with reference to FIGS. 3A, 3B, 3C through 7A, 7B. FIGS. 3A, 3B, 3C through 7A, 7B show various steps of fabricating a region Z1 where the polarizer 32 (see FIG. 1) Is formed, a region Z2 where the phase modulator 30 (see FIG. 1) is formed, and a region Z3 where an alignment mark (not shown in FIG. 1) is formed.

Figure 3A:
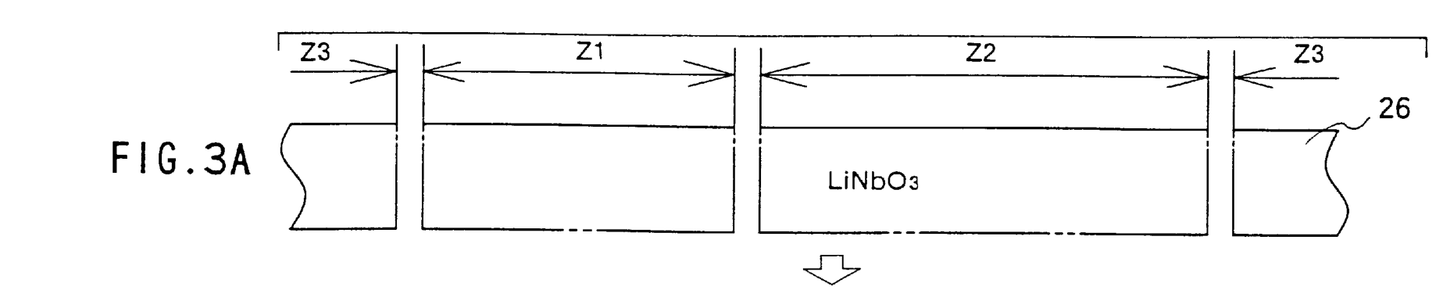
FIG. 3A is a cross-sectional view illustrative of a step of cleaning an $LiNbO_3$ substrate.

First, as shown In FIG. 3A, an LiNbO$_3$ substrate 26 is cleaned.

Figure 3B:
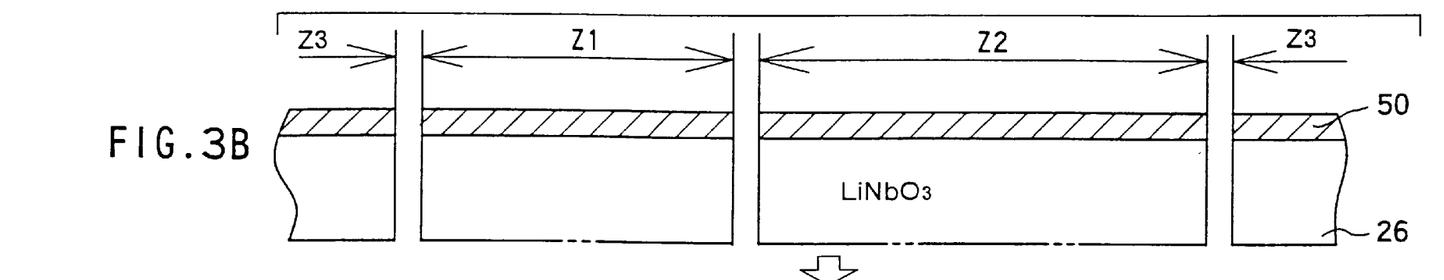
FIG. 3B is a cross-sectional view illustrative of a step of forming a photoresist film.

Then, as shown in FIG. 3B, a photoresist is coated on the LiNbO$_3$ substrate 26, producing a photoresist film 50.

Figure 3C:
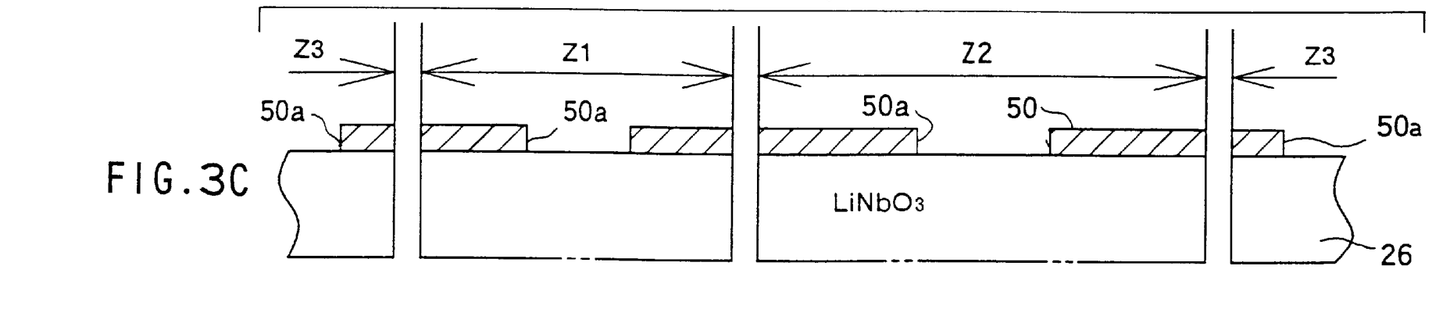
FIG. 3C is a cross-sectional view illustrative of a step of exposing and developing the photoresist film.

Thereafter, as shown in FIG. 3C, the photoresist film 50 is exposed and developed, defining openings 50a (including windows) in the photoresist film 50 in areas where optical waveguides and an alignment mark will be formed.

Figure 4A:
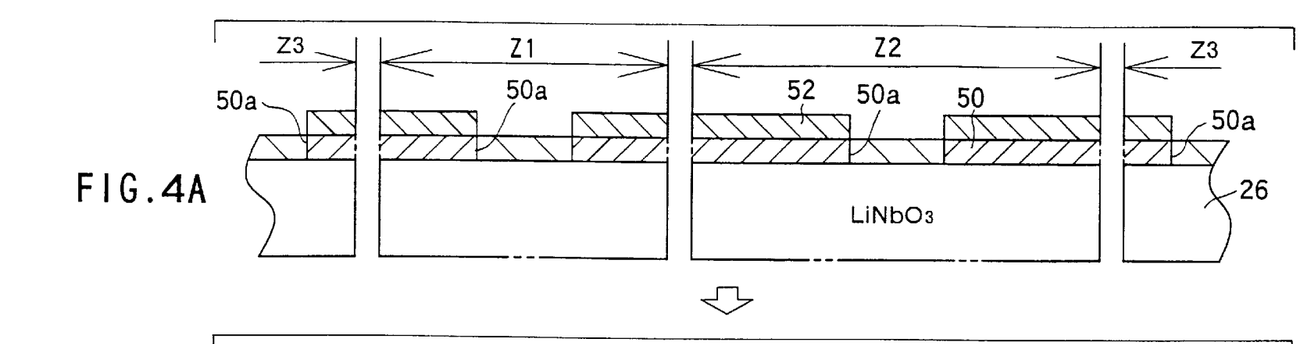
FIG. 4A is a cross-sectional view illustrative of a step of forming a Ti film.

Then, as shown in FIG. 4A, a Ti film 52 is deposited on the entire surface including the openings 50a in the photoresist film 50.

Figure 4B:
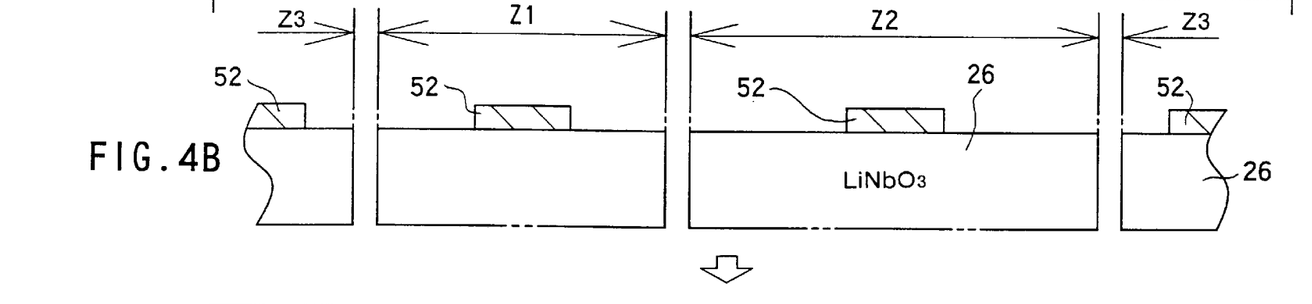
FIG. 4B is a cross-sectional view illustrative of a step of lifting off the Ti film.

Thereafter, as shown in FIG. 4B, the photoresist film 50 is lifted off the LiNbO$_3$ substrate 26, removing the Ti film 50 on the photoresist film 50 together with the photoresist film 50, and leaving the Ti film 52 only in the areas where optical waveguides and an alignment mark will be formed.

Figure 4C:
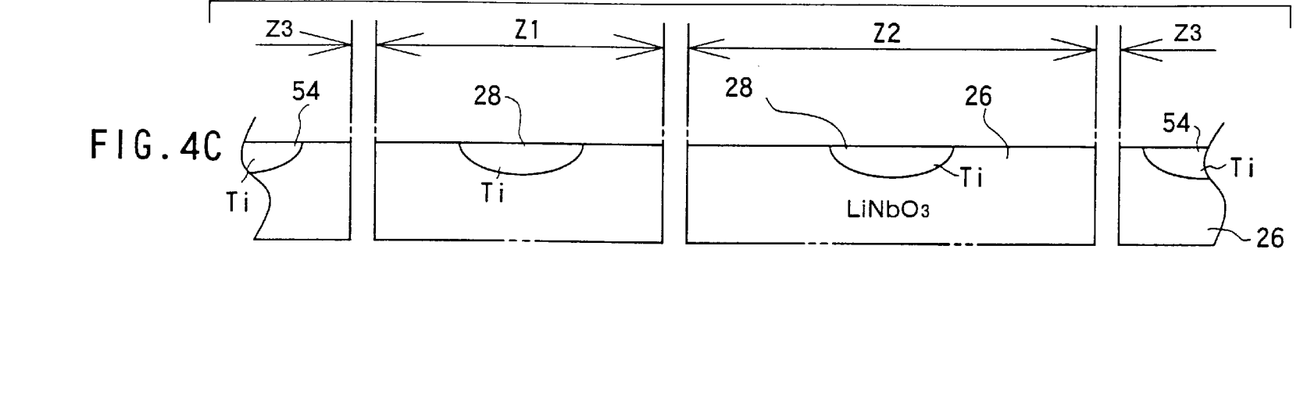
FIG. 4C is a cross-sectional view illustrative of a step of thermally diffusing the Ti film.

Subsequently, as shown in FIG. 4C, the LiNbo$_3$ substrate 26 is placed in a thermal diffusion furnace and subjected to heat treatment therein. When thus heat-treated, the Ti film 52 is oxidized, diffusing Ti into the LiNbO$_3$ substrate 26 thereby to form optical waveguides 28 and a Ti-diffused area 54 which will serve as an alignment mark.

Figure 5A:
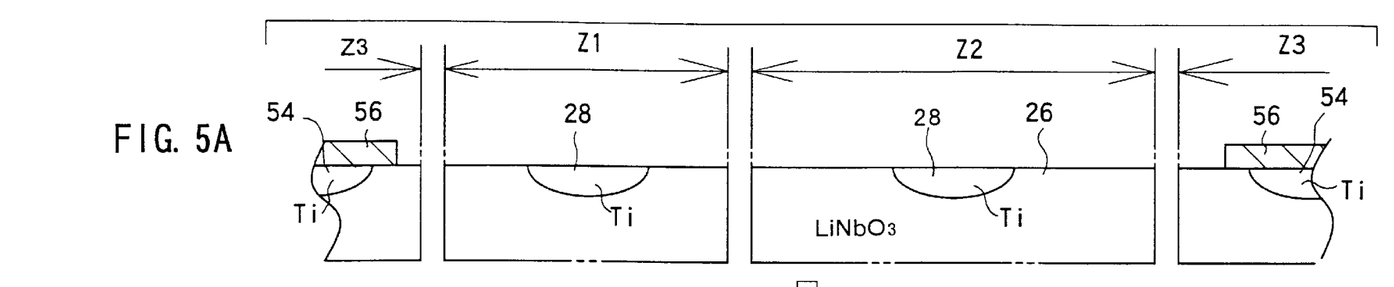
FIG. 5A is a cross-sectional view illustrative of a step of forming and patterning a Cr film.

Then, as shown in FIG. 5A, a Cr layer 56 is deposited on the Ti-diffused area 54, visualizing an alignment mark which can be optically detected for positioning.

Figure 5B:
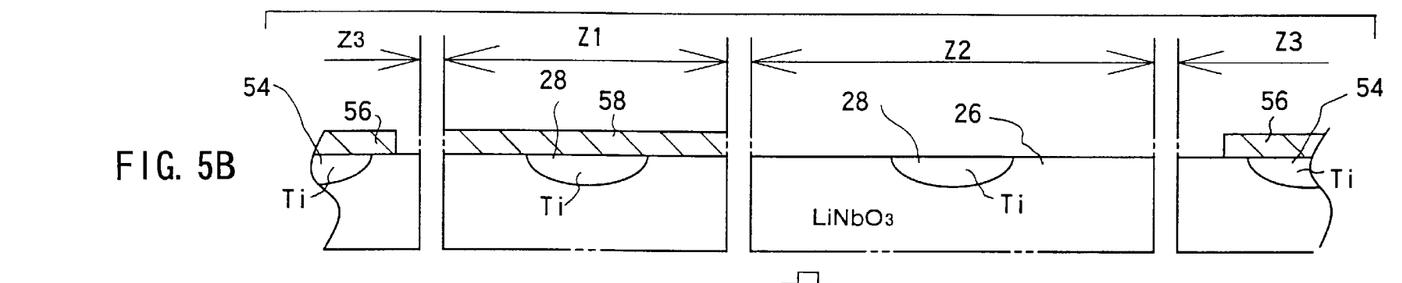
FIG. 5B is a cross-sectional view illustrative of a step of forming and patterning an oxide film.

Thereafter, as shown in FIG. 5B, an oxide film 58 which will serve as a buffer layer of a polarizer is formed on one of the optical waveguides 28 on which the polarizer will be formed.

Figure 5C:
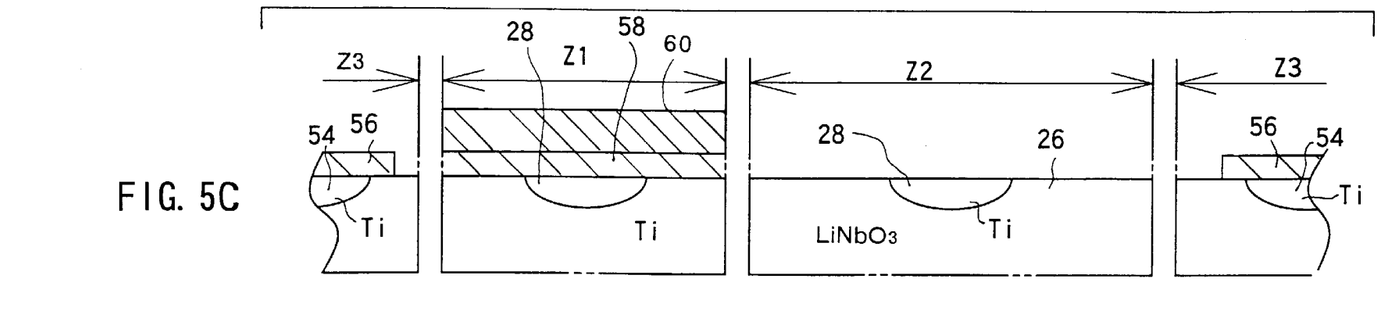
FIG. 5C is a cross-sectional view illustrative of a step of forming and patterning an Al film.

Subsequently, as shown in FIG. 5C, an Al film 60 is formed on the oxide film 58.

Figure 6A:
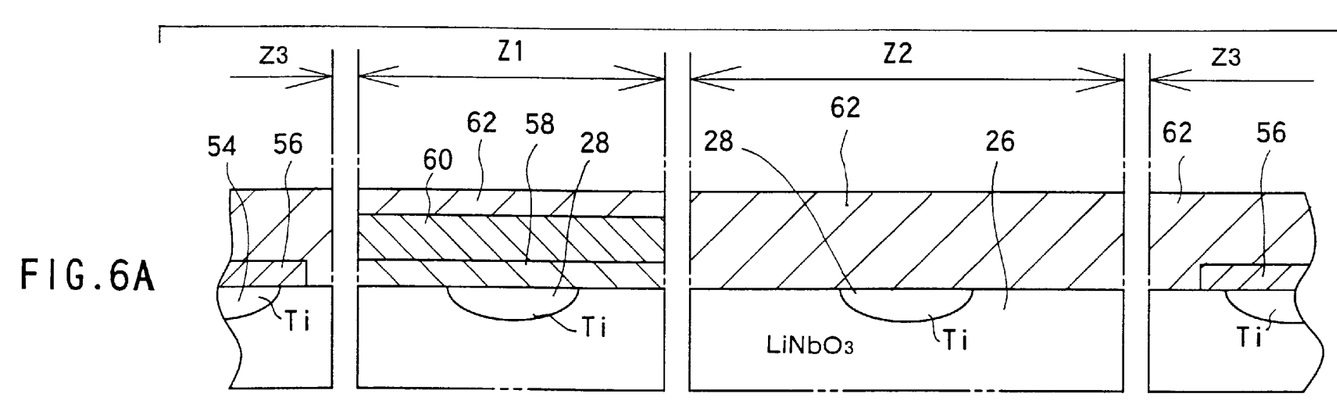
FIG. 6A is a cross-sectional view illustrative of a step of forming a photoresist film.

Then, as shown in FIG. 6A, a photoresist is coated on the LiNbO$_3$ substrate 26, producing a photoresist film 62.

Figure 6B:
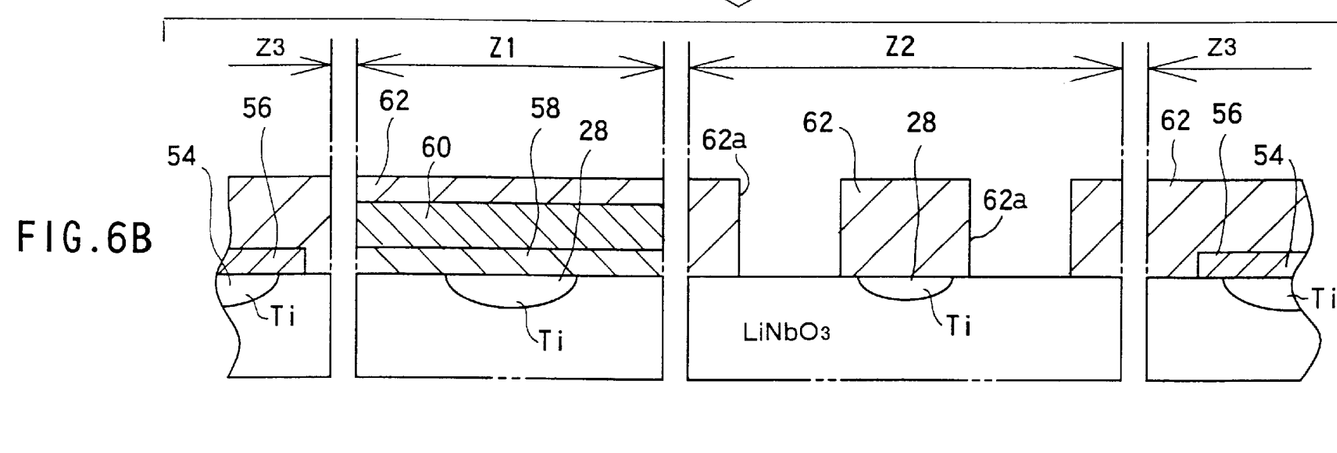
FIG. 6B is a cross-sectional view illustrative of a step of exposing and developing the photoresist film.

Thereafter, as shown in FIG. 6B, the photoresist film 62 is exposed and developed, defining openings 62a (including windows) in the photoresist film 62 in areas where electrodes of a phase modulator 30 will be formed.

Figure 7A:
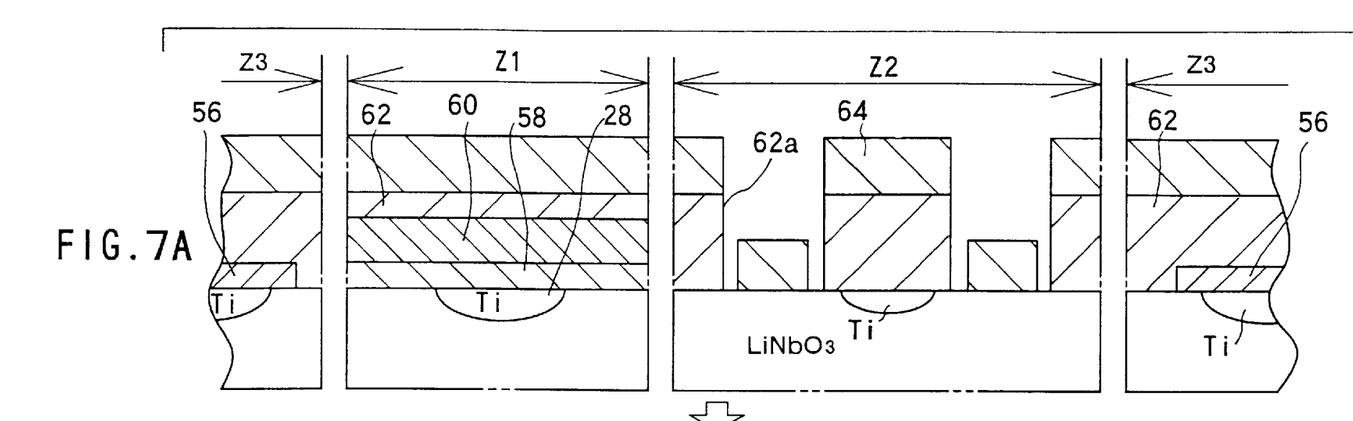
FIG. 7A is a cross-sectional view illustrative of a step of forming an electrode film.

Then, as shown in FIG. 7A, a multilayer electrode film 64 is deposited on the entire surface including the openings 62a in the photoresist film 62.

Figure 7B:
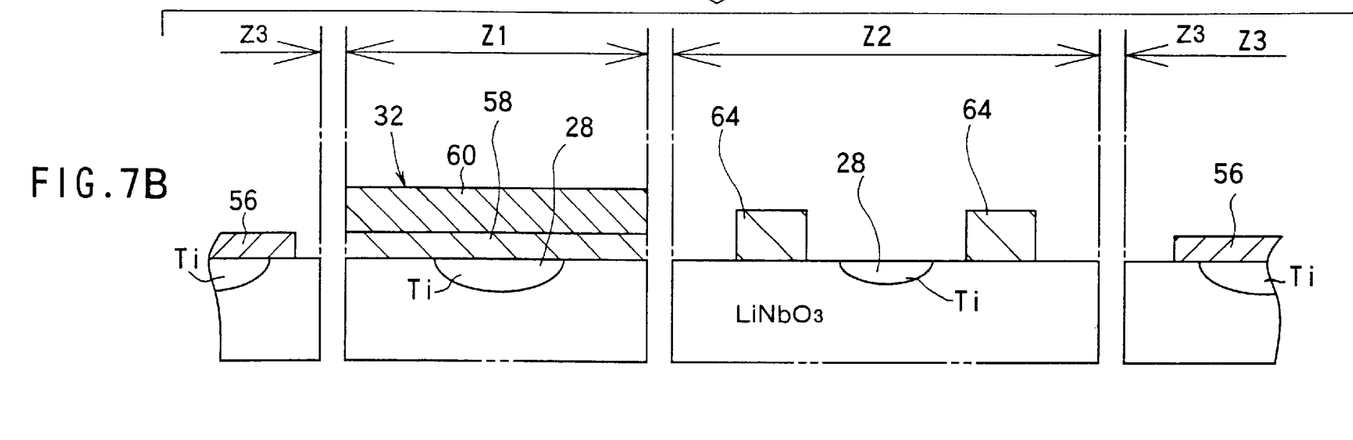
FIG. 7B is a cross-sectional view illustrative of a step of patterning the electrode film.

Thereafter, as shown in FIG. 7B, the photoresist film 62 is lifted off the LiNbO$_3$ substrate 26, removing the electrode film 64 on the photoresist film 62 together with the photoresist film 62.

At this time, a polarizer 32 is formed of the oxide film 58 and the Al film 60 on the LiNbO$_3$ substrate 26 in the region Z1, and electrodes are formed of the electrode film 64 one on each side of the optical waveguide 28 in the region Z2.

Figure 8:
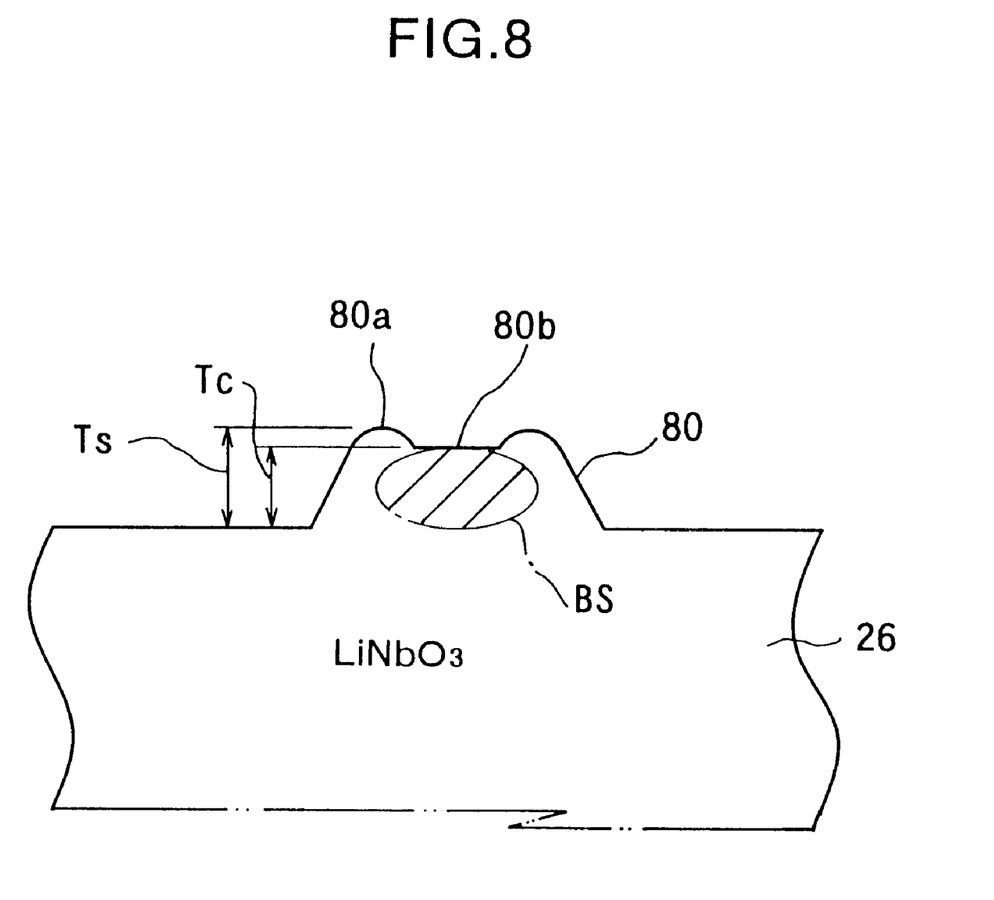
FIG. 8 is a cross-sectional view of the optical IC chip, showing a cross-sectional shape thereof along a plane perpendicular to the optical axis of a step in a Ti-diffused region.

In the optical IC chip 24 according to the illustrated embodiment, after the Ti film 52 is thermally diffused as shown in FIG. 4C, the LiNbO$_3$ substrate 26 is shaped, particularly in a plane normal to the optical axis, as follows:

As shown in FIG. 8, the LiNbO$_3$ substrate 26 has a step 80 (produced by the oxidizing reaction of the Ti film 52) on its surface corresponding to the Ti-diffused area, and the step 80 has opposite side edges 80a whose height Ts is greater than the height Tc of a central area 80b of the step 80, so that the side edges 80a are raised higher than the central area 80b.

Figure 9A:
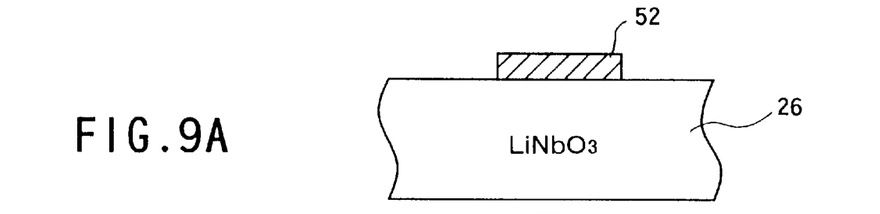
FIG. 9A is a cross-sectional view showing a stage in which a Ti film is formed on an $LiNbO_3$ substrate.
Figure 9B:
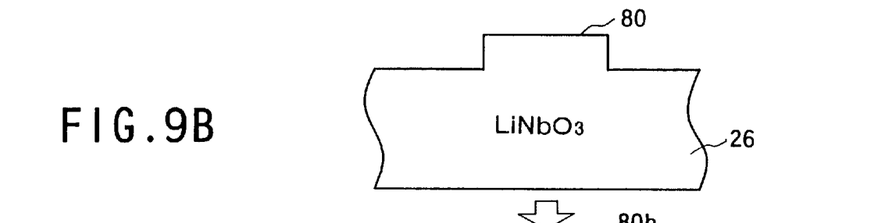
FIG. 9B is a cross-sectional view showing a stage in which a step grows upwardly in an oxidizing reaction of the Ti film.
Figure 10A:
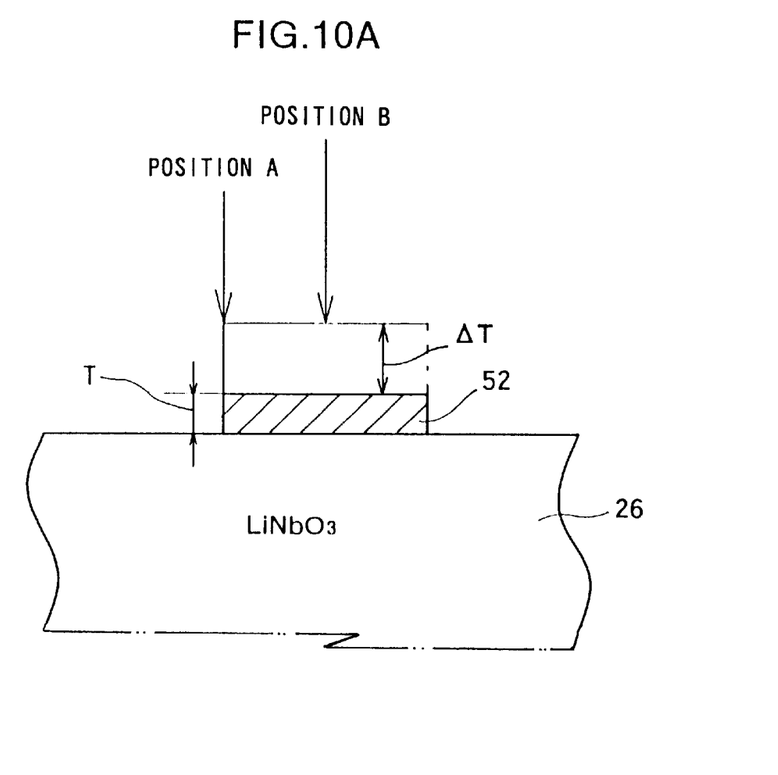
FIG. 10A is a cross-sectional view of a sample used in an experimental example used to observe the degree of upward growth of a step produced in an oxidizing reaction of a Ti film.
Figure 10B:
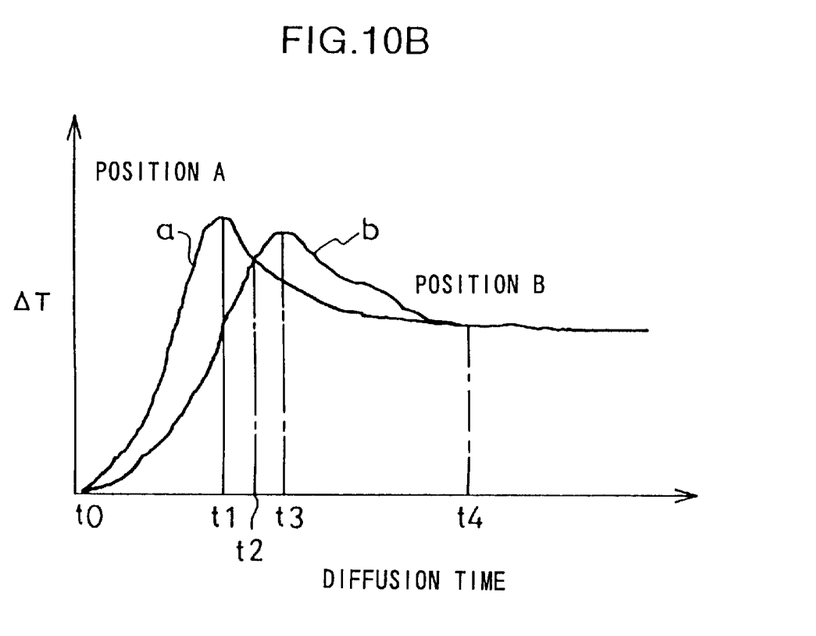
FIG. 10B is a diagram showing the experimental results of the experimental example.

The above shape of the LiNbO$_3$ substrate 26 is achieved by the following process:

After the steps shown in FIGS. 3A through 4B with the Ti film 52 selectively formed on the LiNbO$_3$ substrate 26 (see FIG. 9A), Ti is thermally diffused into the LiNbO$_3$ substrate 26 in the step shown in FIG. 4C. Since Ti is thermally diffused into the LiNbO$_3$ substrate 26 in an oxidizing atmosphere, as shown in FIG. 9B, Ti in the Ti film 52 on the LiNbO$_3$ substrate 26 changes into titanium oxide (TiO$_2$) due to the oxidizing reaction, producing the step 80 which grows upwardly with time. It has been experimentally found that the degree of upward growth of the side edges 80a of the step 80 differs from the degree of upward growth of the central area 80b of the step 80. An experimental sample used in the experiment is shown in FIG. 10A, and the experimental results are shown in FIG. 10B. As shown in FIG. 10A, the experimental sample comprised a Ti film 52 deposited on an LiNbO$_3$ substrate 26 under the same evaporating conditions as is the case with the optical IC chip 24 according to the embodiment. A side edge of the Ti film 52 is defined as a position A, and a central area thereof as a position B, with the degree of growth (extent of growth) upon oxidization of the Ti film 52 being defined as $\Delta T$. In FIG. 10B, the degree of growth at the position A is represented by the solid-line curve a, and the degree of growth at the position B is represented by the solid-line curve b.

Theoretically, the central area 80b is subjected only to a downward oxidizing reaction, and the side edges 80b are subjected to reactions in at least two directions, i.e., both a downward oxidizing reaction and a lateral oxidizing reaction. Therefore, it is considered that the degree of upward growth of the side edges 80a is greater than the degree of upward growth of the central area 80b.

A maximum value of the degree of upward growth (extent of growth) is determined by the thickness of the Ti film 52, etc. Once the degree $\Delta T$ of growth reaches its maximum value, the height of the step 80 gradually decreases with time. This is considered to result from the fact that when the degree ΔT of growth reaches its maximum value, the oxidizing reaction of the Ti film 52 comes to an end, and thereafter only the diffusion of Ti into the LiNbO₃ substrate 26 progresses. The decrease in the degree of ΔT of growth (extent of growth) saturates when the diffusion of Ti is completed.

In FIG. 10B, the period of time from a time t0 when the thermal diffusion starts to a time t3 when the degree of growth of the central area 80b reaches its maximum value is a period of time in which the oxidizing reaction of the Ti film 52 is in progress, i.e., the diffusion of into the LiNbo₃ substrate 26 is still in progress during this period of time. Particularly, since the side edges 80a undergoes a faster oxidizing reaction than the central area 80b, the period of time in which the degree of growth of the side edges 80a reaches its maximum value is shorter than the period of time in which the degree of growth of the central area 80b reaches its maximum value.

Figure 9C:
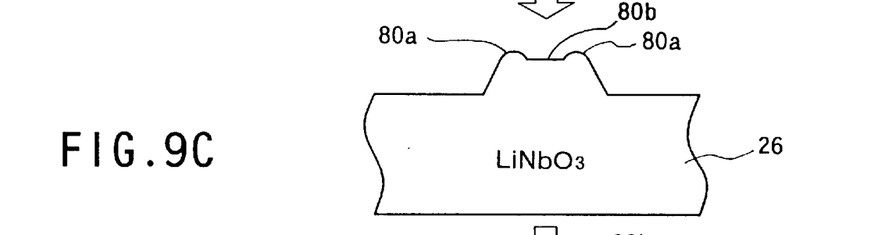
FIG. 9C is a cross-sectional view showing a stage in which side edges of the step reaches a maximum height.
Figure 9D:
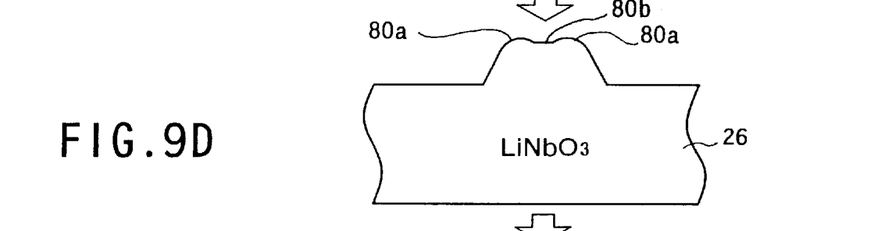
FIG. 9D is a cross-sectional view showing a stage in which the height of the side edges of the step gradually decreases.
Figure 9E:
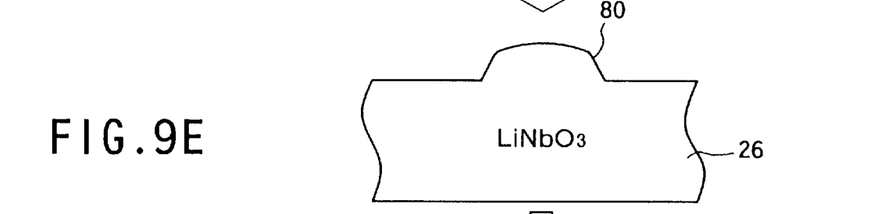
FIG. 9E is a cross-sectional view showing a stage in which the height of the side edges and the height of a center of the step are temporarily in agreement with each other.
Figure 9F:
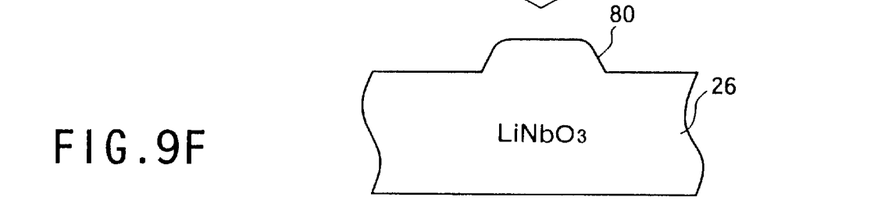
FIG. 9F is a cross-sectional view showing a stage in which the diffusion of Ti is completely ended.

At a time t1 when the degree of growth of the side edges 80a reaches its maximum value, the oxidizing reaction of the side edges 80a is finished. Thereafter, the height Ts of the side edges 80a gradually decreases as Ti is diffused into the LiNbO₃ substrate 26. FIG. 9C shows the shape of the step 80 at the time t1, and FIGS. 9D–9F show the shapes of the step 80 as the height thereof is progressively reduced.

As the height Ts of the side edges 80a gradually decreases, the shape the step 80 varies as follows: After the time t1 (see FIG. 9C) when the degree of growth of the side edges 80a reaches its maximum value, the step 80 is shaped as shown in FIG. 9D. Then, at a time t2, the height Ts of the side edges 80a agrees with the height Tc of the central area 80b (see FIG. 9E). At the next time t3, the degree of growth of the central area 80b reaches its maximum value. At the time t3, the height Tc of the central area 80b is greater than the height Ts of the side edges 80a. Subsequently, the height Tc of the central area 80b starts decreasing owing to the diffusion of Ti into the LiNbO₃ substrate 26. After a time t4, the height Ts of the side edges 80a and the height Tc of the central area 80b are essentially the same as each other (see FIG. 9F). At this stage, the surface of the step 80 is very smooth.

In this embodiment, during the oxidizing reaction of the Ti film 52 (from the time t0 to the time t3), the thermal diffusion step is forcibly finished at any time (see FIG. 9D) between the time t1 when the degree of growth of the side edges 80a reaches its maximum value to the time t2 when the height Ts of the side edges 80a agrees with the height Tc of the central area 80b. Stated otherwise, the thermal diffusion step is finished before the diffusion of Ti into the LiNbO₃ substrate 26 is completed.

The time at which to finish the thermal diffusion step can easily be determined by a time control process. Alternatively, the period of time for the thermal diffusion step may be set to the conventional period of time (up to the time t4 in FIG. 10B), for example, and the temperature in the diffusion furnace may be set to a low level for allowing the phenomenon which would otherwise occur from the time t1 to the time t2 to occur at the time t4.

In this embodiment, as described above, the side edges 80a of the step 80 (produced by the oxidizing reaction of the Ti film 52) in the Ti-diffused areas (28, 54) of the LiNbO₃ substrate 26 are raised higher than the central area 80b thereof. Therefore, the distribution of heights of the step 80 in the Ti-diffused areas is irregular, and the diffused distribution of Ti is anisotropic due to the raised side edges 80a.

As a result, as shown in FIG. 8, it is possible to reduce the shape of a plane perpendicular to the optical axis with respect to the diffused distribution of Ti, i.e., the mode shape BS in the substrate direction of the light beam propagated through the optical waveguide 28.

The mode shape BS may have a desired aspect ratio by controlling the raising of the side edges 80a or selecting the width of the Ti film 52 which serves as a Ti diffusion source.

Consequently, the optical IC chip 24 according to this embodiment has a relatively small coupling loss with respect to an optical fiber having a different light beam aspect ratio, thus eliminating optical device loss faults. This leads to an increase in the yield of optical IC chips 24, and contributes to an increase in the productivity of optoelectronic devices such as optical fiber gyros or the like which incorporate the optical IC chip 24.

In the process of manufacturing the optical IC chip 24, the thermal diffusion step is finished before the diffusion of Ti into the LiNbO₃ substrate 26 is completed. Consequently, the optical waveguide 28 is formed while interrupting the diffusion of Ti into the LiNbO₃ substrate 26, leaving Ti undiffused at the center of the optical waveguide 28. As a result, the surface refractive index of the center of the optical waveguide 28 is increased to achieve a large difference between the refractive indexes of the LiNbO₃ substrate 26 and the optical waveguide 28.

By controlling the end of the thermal diffusion step as described above, the side edges 80a of the step 80 formed on the LiNbO₃ substrate 26 in the Ti-diffused area can be raised higher than the central area 80b of the step 80, making the diffused distribution of Ti anisotropic.

Since the side edges 80a of the step 80 are raised, the shape of the diffused distribution of Ti may be given substantially the same aspect ratio as a polarization-maintaining fiber that will be optically coupled to the optical IC chip 24.

Furthermore, the width and thickness T of the Ti film 52 formed on the LiNbO₃ substrate 26 may be selected to make the mode shape BS of a light beam propagated through the optical waveguide 28 substantially equal to the mode shape of a light beam propagated through a polarization-maintaining fiber whose core has an elliptical cross-sectional shape having a minor (vertical) axis of 3 μm and a major (horizontal) axis of 5 μm, for thereby greatly reducing a coupling loss with respect to the polarization-maintaining fiber. In the illustrated embodiment, it is possible to substantially equalize the mode shape BS of a light beam propagated through the optical waveguide 28 to the mode shape of a light beam propagated through the polarization-maintaining fiber, with an error of about ±5%.

In the process of manufacturing the optical IC chip 24 according the embodiment, the thermal diffusion step shown in FIG. 4C is forcibly finished before the diffusion of Ti is completed, for thereby raising the side edges 80a of the step 80 higher than the central area 80b thereof. Such a raised configuration is also achieved on a step in an area where an alignment mark is formed.

Figure 11:
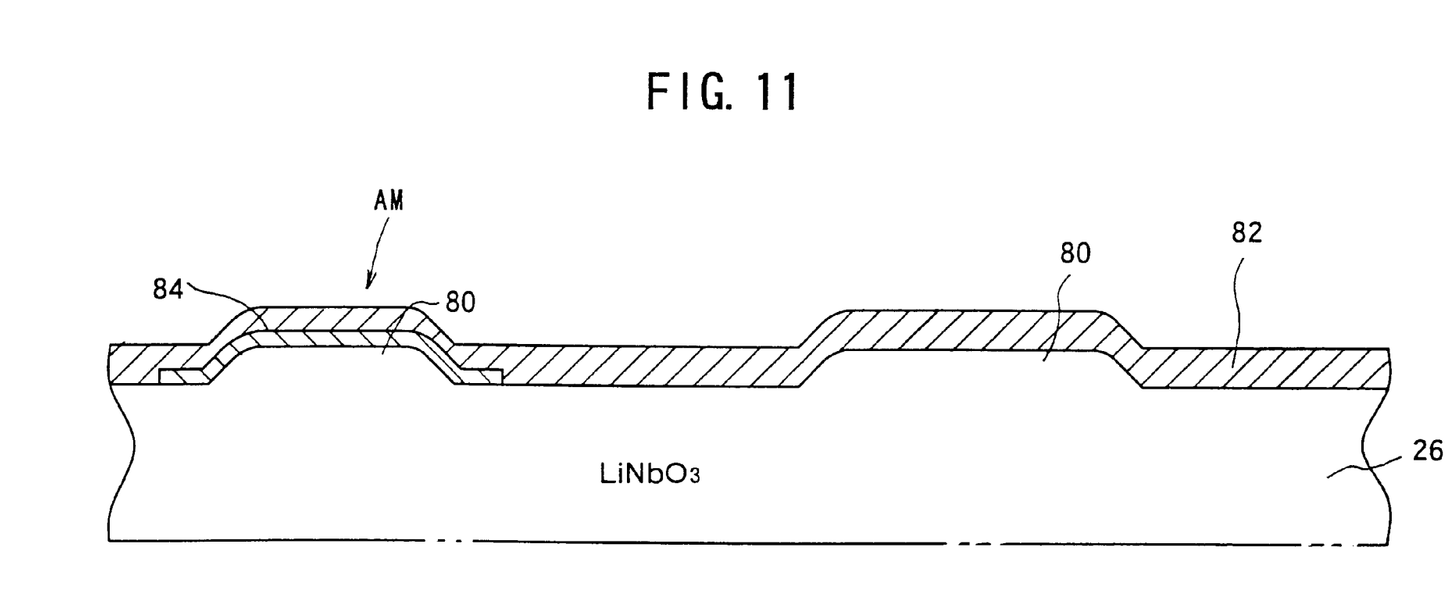
FIG. 11 is a cross-sectional view illustrative of a general process of visualizing an alignment mark by forming a metal film.
Figure 12:
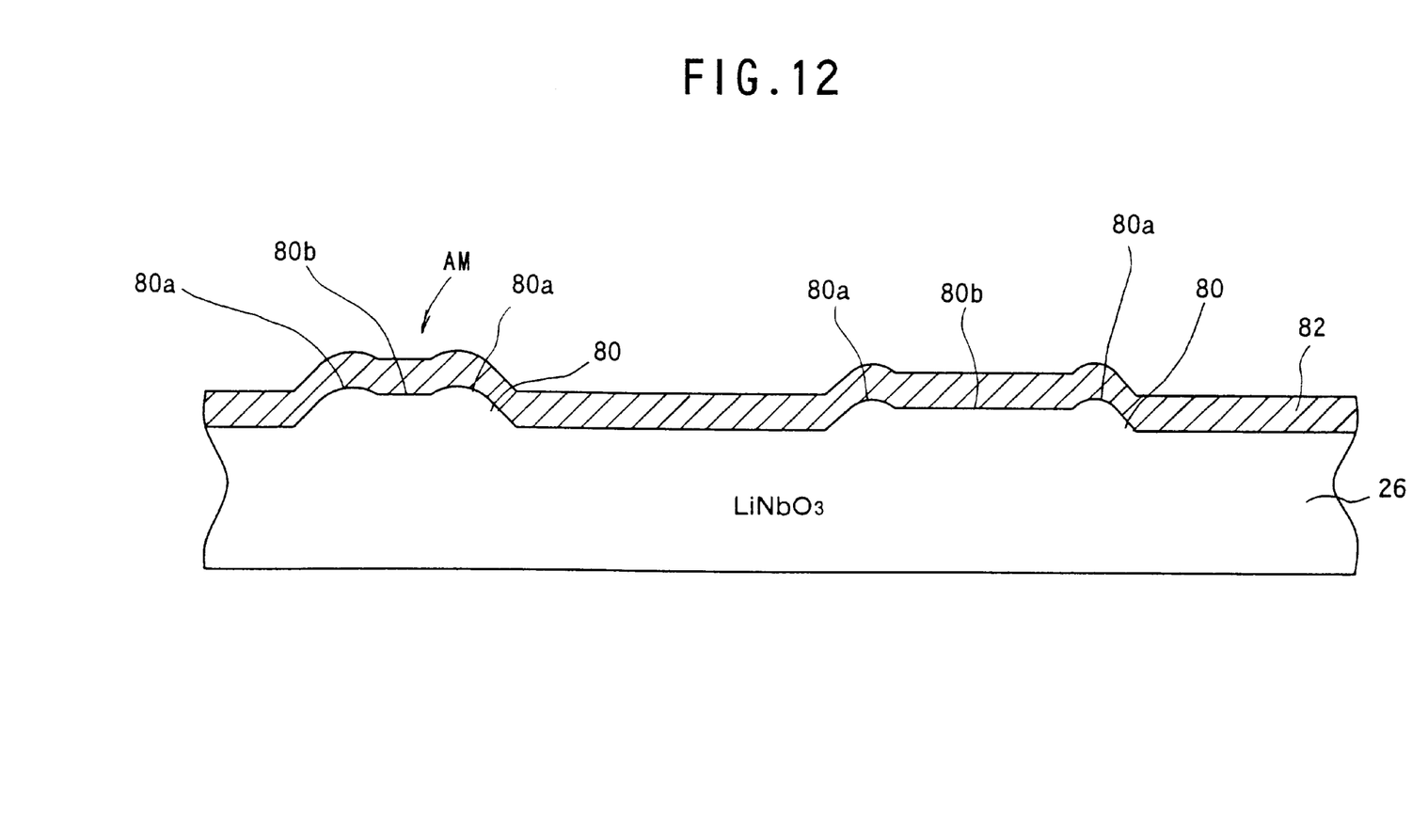
FIG. 12 is a cross-sectional view illustrative of a method of manufacturing the optical IC chip, which is dispensed with the process of visualizing an alignment mark by forming a metal film.

Heretofore, as shown in FIG. 11, a step 80 in an area where an alignment mark AM is formed has a smooth surface. Therefore, for optically detecting the alignment mark AM, it has heretofore been necessary to add a metal film 84 such as a Cr film having a higher reflectance than the LiNbO₃ substrate 26 and the photoresist film 82. With the optical IC chip 24 according to this embodiment, since the side edges 80a of the step 80 are raised, as shown in FIG. 12, the profile of the step 80 can optically clearly be detected.

Consequently, it is not necessary to add a metal film 84 for detecting an alignment mark, and hence various steps which would otherwise be needed to form the metal film 84, e.g., steps to make a mask to form the metal film 84, and clean and dry the assembly. As a result, the process of manufacturing the optical IC chip 24 according the embodiment is relatively simple.

The principles of the present invention have been described as being applied to an optical IC chip 24 incorporated in an optical fiber gyro. However, the principles of the present invention may be applied to other optical waveguide devices for use in transmitter/receiver modules for optical communications, optical heads for use with optical disks, i.e., disk-shaped recording mediums including compact discs, CD-ROMs, CD-Rs, magnetooptical disks, etc., processing elements for use with optical computers, wide-band variable-wavelength lasers, and so on.

Although a certain preferred embodiment of the present invention has been shown and described in detail, it should be understood that various changes and modifications may be made therein without departing from the scope of the appended claims.

What is claimed is:

1. An optical waveguide device comprising:

an $LiNbO_3$ substrate; and an optical waveguide disposed on said $LiNbO_3$ substrate by diffusing Ti therein;

said optical waveguide having opposite side edges, at least one of which is raised higher than a central area of the optical waveguide.

2. An optical waveguide device according to claim 1, wherein:

said Ti has a diffused distribution that has substantially the same aspect ratio as a polarization-maintaining fiber adapted to be optically coupled to said optical waveguide.

3. An optical waveguide device according to claim 2, wherein said polarization-maintaining fiber comprises a core having an elliptical cross-sectional shape.

4. An optical waveguide device comprising:

an $LiNbO_3$ substrate; and an optical waveguide disposed on said $LiNbO_3$ substrate by diffusing Ti in an area thereof;

said $LiNbO_3$ substrate having a step on a surface thereof which corresponds to said area in which Ti is diffused, said step having opposite side edges and a central area therebetween, said side edges having a height greater than a height of said central area, whereby said side edges are raised higher than said central area.

5. An optical waveguide device according to claim 2, wherein said step is formed by an oxidizing reaction of a Ti film disposed on said $LiNbO_3$ substrate.

6. A method of manufacturing an optical waveguide device, comprising the steps of:

forming a Ti film on an $LiNbO_3$ substrate; and, heat-treating said $LiNbO_3$ substrate to thermally diffuse Ti from said Ti film into said $LiNbO_3$ substrate, wherein said step of heat-treating said $LiNbO_3$ substrate is finished while said Ti film grows upwardly upon oxidation thereof and at a time when the height of side edges of said Ti film is greater than the height of a central area of said Ti film.

7. A method according to claim 6, wherein said step of heat-treating said $LiNbO_3$ substrate is finished by controlling a period of time in which Ti is diffused into said $LiNbO_3$ substrate.

8. A method according to claim 6, wherein said step of heat-treating said $LiNbO_3$ substrate is finished by controlling the temperature of an atmosphere in which the said $LiNbO_3$ substrate is heat-treated.

* * * * *